United States Patent [19]

Wakui

[11] Patent Number: 5,067,033
[45] Date of Patent: Nov. 19, 1991

[54] ROTATION CONTROL DEVICE USING REPRODUCED SYNCHRONIZING SIGNAL

[75] Inventor: Tetsuya Wakui, Chiba, Japan
[73] Assignee: Canon Kabushiki Kaisha, Tokyo, Japan
[21] Appl. No.: 369,011
[22] Filed: Jun. 15, 1989
[30] Foreign Application Priority Data Jun. 21, 1988 [JP] Japan .................. 63-154515

[51] Int. Cl.[5] .............................................. G11B 21/04
[52] U.S. Cl. ..................................... 360/70; 360/77.13
[58] Field of Search ........................... 360/70, 77.13; 369/44.25; 358/321, 338

[56] References Cited

U.S. PATENT DOCUMENTS

| 4,672,475 | 6/1987 | Nakasho | 360/70 |
| 4,920,435 | 4/1990 | Yamazaki | 360/70 X |
| 4,924,326 | 5/1990 | Takimoto et al. | 360/70 X |

FOREIGN PATENT DOCUMENTS 61-214164 9/1986 Japan ..................... 360/70

OTHER PUBLICATIONS

Webster, C. R., "A New Sync-Lock Servo System for Video Tape Recording", Tech. paper delivered to IEEE, Sep. 23, 1965.

Primary Examiner—Aristotelis Psitos
Assistant Examiner—David L. Robertson
Attorney, Agent, or Firm—Robin, Blecker, Daley & Driscoll

[57] ABSTRACT

A rotation control device comprises a rotary body arranged to move a head and a recording medium relative to each other in performing recording or reproduction on or from the recording medium; means for performing speed servo-control by detecting any speed deviation of the rotary body; means for performing phase servo-control by detecting any phase deviation of the rotary body; and means for performing the speed servo-control over the rotary body by detecting a phase-locked state of the rotary body and by synchronizing the rotary body with a synchronizing signal reproduced from the recording medium.

23 Claims, 5 Drawing Sheets

FIG.1

FIG.3(a) REFERENCE SIGNAL PULSE

FIG.3(b) RAMP VOLTAGE

FIG.3(c) PG

FIG.3(d) PHASE ERROR VOLTAGE

ROTATION CONTROL DEVICE USING REPRODUCED SYNCHRONIZING SIGNAL

BACKGROUND OF THE INVENTION

1. Field of the Invention

This invention relates to a rotation control device for controlling the rotation of a rotary body which is arranged to cause a recording medium and a head which is provided for recording or reproduction on or from the recording medium to move relative to each other.

2. Description of the Related Art

The rotary head drum driving system of a helical scanning type video tape recorder or the like, for example, is required to allow a magnetic head mounted on a rotary head drum to scan recording tracks on a magnetic tape at a high speed and with a high degree of accuracy. To meet this requirement, the rotary head drum driving system of this kind has been provided with a servo-control device for controlling the rotation of the rotary head drum and that of a capstan or the like which causes the magnetic tape to travel in such a manner as to keep them under a given condition.

The drum servo-control for the rotary head drum has been performed in varied manners including, for example: A speed servo-control method in which a so-called FG pulse which gives a pulse signal according to the rotational frequency of the rotary head drum is detected and the speed servo-control is applied to the head drum to keep its rotational frequency at a given value according to the result of detection; and a phase servo-control method in which a so-called PG pulse which represents a rotation phase of the rotary head drum and the rotation of the rotary head drum is controlled to keep the rotation phase at a given value.

The speed servo-control method of using the FG pulse is suited for controlling the rotational frequency to the given value against such a great change that takes place at the start of the rotation of the rotary head or the like. The phase servo-control method of using the PG pulse is suited for controlling the rotation phase of the rotary head drum against its minor changes or fluctuations. With servo-control devices of these methods employed, the rotation of the rotary head drum can be highly accurately controlled.

Both the servo-control methods are carried out on the basis of position information (FG and PG) obtained by a device disposed at the rotary head drum or a head drum driving motor. Therefore, the rotation of the rotary head drum can be accurately stabilized for a recording operation according to these methods. However, in the case of reproduction, the adoption of these methods brings about jitters resulting in a transverse sway on a reproduced picture plane due to a positional deviation, inaccurate position information, a mechanical change in the recording medium (or tape) such as the elongation of the tape, and vibrations taking place in a tape transport system. The conventional rotation control which relies solely on the rotational-position information obtained from a rotary body thus has been incapable of effectively coping with time base changes that take place during reproduction.

SUMMARY OF THE INVENTION

This invention is aimed at the solution of the above-stated problems of the prior art. It is therefore a first object of the invention to provide a rotation control device which is capable of highly accurately moving a recording medium and a head relative to each other without having any positional discrepancy between them.

It is a second object of the invention to provide a rotation control device which controls, according to information recorded on a recording medium, a rotary body arranged to move the recording medium and a head relative to each other.

It is a third object of the invention to provide a rotation control device for a video tape recorder or the like which prevents a reproduced picture plane from swaying due to jitters or the like by controlling the rotation of a rotary head relative to a traveling magnetic tape.

To attain this object, a rotation control device which is arranged according to this invention as a preferred embodiment thereof comprises:

a rotary body for moving a recording medium and a head means relative to each other;

speed control means for detecting a speed deviation of the rotary body and for controlling a rotation speed of the rotary body according to the speed deviation detected;

phase control means for detecting a rotation phase deviation of the rotary body and for controlling a rotation phase of the rotary body according to the rotation phase deviation detected; and synchronizing control means for synchronizing, when detecting that the rotation phase of the rotary body has been locked, the rotary body with a signal reproduced from the recording medium by the head means.

A rotation control device which is arranged as another preferred embodiment of the invention comprises:

a rotary body for moving a recording medium and a head means relative to each other;

rotation control means for controlling the rotary body to rotate at a predetermined speed and at a predetermined phase; and supply means for supplying, when detecting that a rotation of the rotary body has been locked to the predetermined phase, to the rotation control means a rotation error signal indicative of a rotation error of the rotary body relative to a control signal recorded on the recording medium.

A video tape recorder arranged as a further preferred embodiment of the invention comprises:

a rotary head drum for rotating a head relative to a tape-shaped recording medium to perform a recording or reproducing operation;

first rotation control means for controlling the rotary head drum to rotate at a predetermined phase; and second rotation control means for controlling, when detecting that the rotary head drum has been locked to the predetermined phase, a rotation speed or a rotation phase of the rotary head drum on the basis of a synchronizing signal reproduced from the tape-shaped recording medium.

The rotation control device arranged in accordance with this invention as described above enables a video tape recorder or the like to give an adequately reproduced picture plane free from any lateral sway as a reproducing operation can be accomplished without any time base fluctuations, which have been hardly removable by the conventional method which relies solely on information on the position of the rotary head drum, in cases where signals are recorded on a recording medium in a state of causing jitters in reproducing them; where the recording medium is deformed due to elongation, etc.; and where vibrations or the like take place in a tape transport system.

These and further objects and features of the invention will become apparent from the following detailed description of embodiments thereof taken in connection with the accompanying drawings.

DETAILED DESCRIPTION OF THE PREFERRED EMBODIMENT

Figure 1:
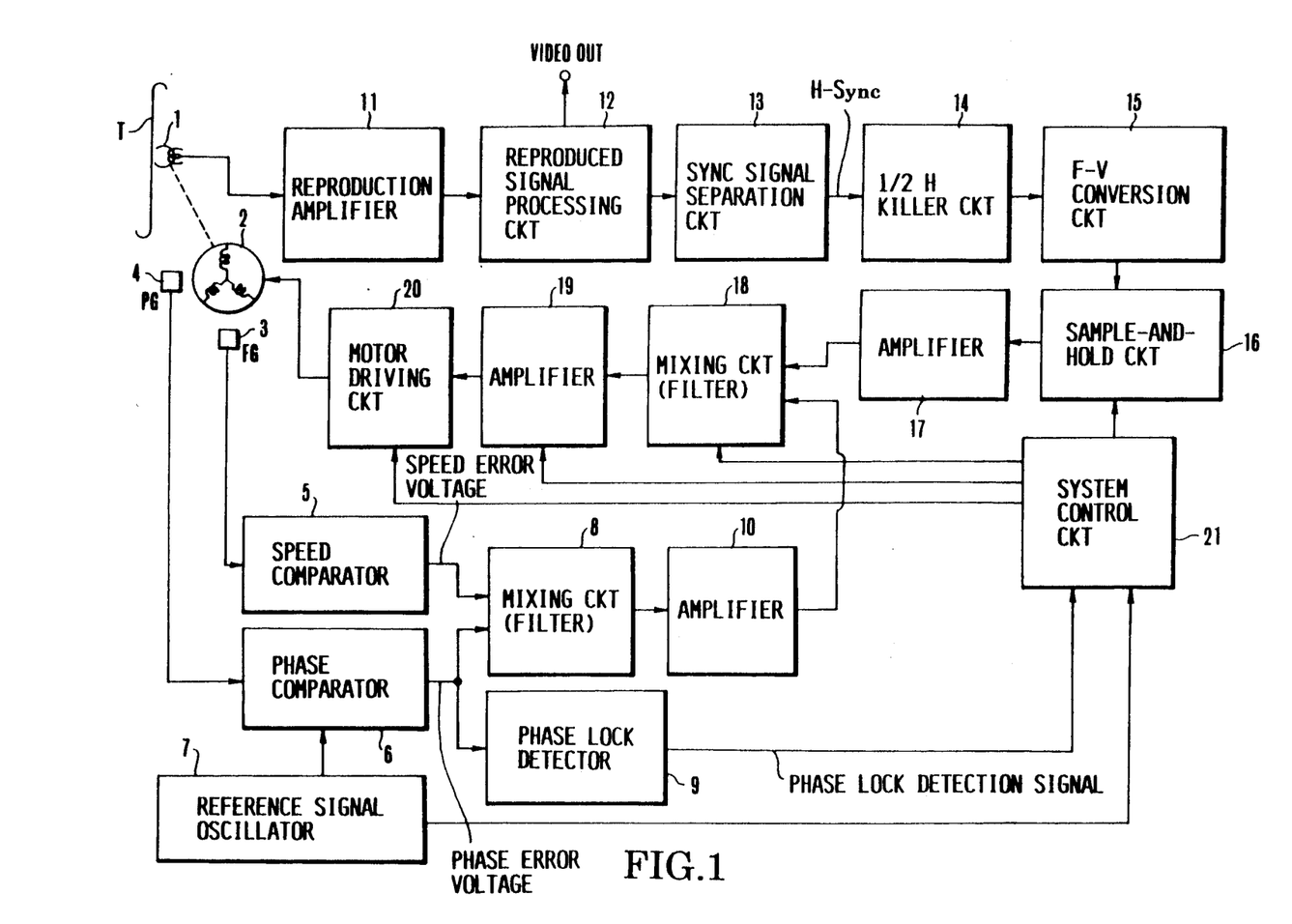
FIG. 1 is a block diagram showing a case where this invention is applied to a helical scanning type video tape recorder.

A rotation control device arranged as a preferred embodiment of the invention is arranged as described below with reference to the accompanying drawings:

FIG. 1 is a block diagram showing by way of example the arrangement of a helical scanning type video tape recorder to which the rotation control device of this invention is applied. Referring to FIG. 1, a magnetic head 1 which is disposed on the outer circumference of a rotary head drum (not shown) is arranged to record or reproduce signals on or from a magnetic tape T which is wrapped around the drum. A drum rotating motor 2 is arranged to drive and rotate the rotary head drum on which the magnetic head 1 is mounted. An FG pulse generator 3 is arranged to generate a pulse signal according to the rotation of the rotary head drum or that of the drum rotating motor 2. A PG pulse generator 4 is arranged to generate a PG pulse which is to be used for detecting the rotation phase of the head drum. A speed comparator 5 is arranged to generate a speed error voltage by frequency-to-voltage (F-V) converting the FG pulse output from the FG pulse generator 3. A phase comparator 6 is arranged to generate a phase error voltage by comparing the phase of the PG pulse output from the PG pulse generator 4 with that of a reference signal output from a reference signal oscillator 7. The reference signal oscillator 7 is arranged to supply the phase comparator 6 with the reference pulse for the phase comparison.

Figures 2A, 2B:
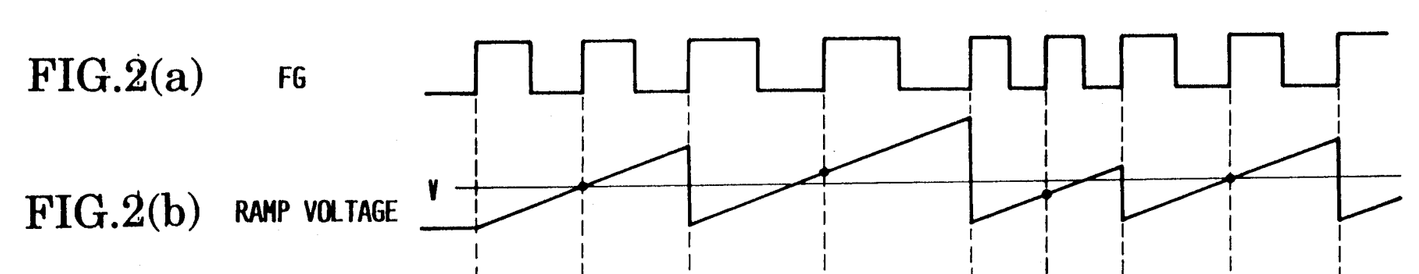
FIGS. 2(a) to 2(d) are timing charts for explaining a speed servo-control operation performed on the basis of an FG pulse signal.
Figure 2C:
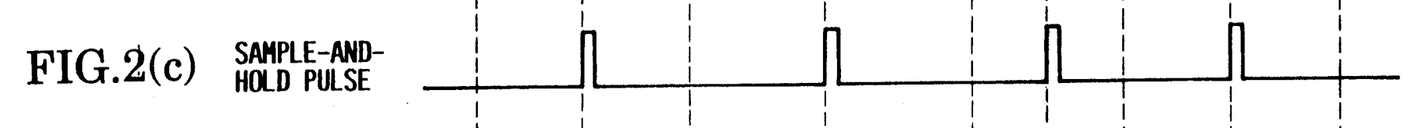
Figure 2D:
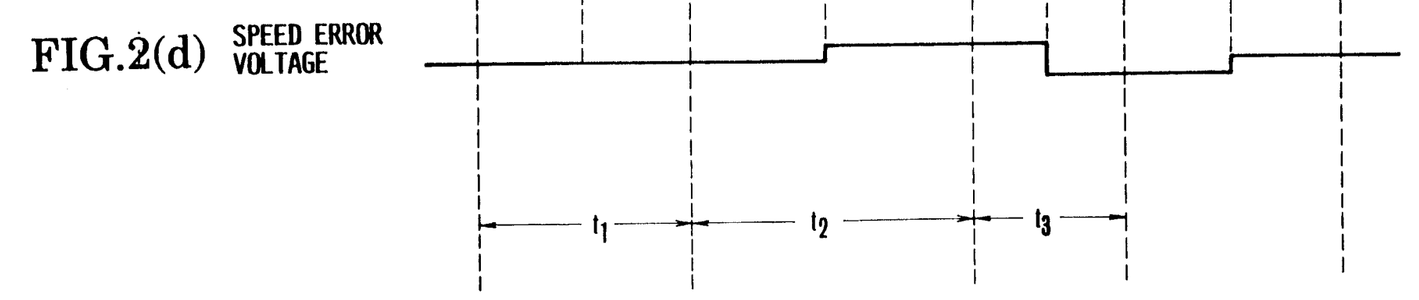

The speed comparator 5 and the phase comparator 6 can be arranged in varied manners. One example of such arrangement is as described below:

FIGS. 2(a) to 2(d) are timing charts for explaining the operation of the speed comparator 5 which is arranged to receive the FG pulse and to generate the speed error voltage. Upon receipt of the FG pulse which is shown in FIG. 2(a), the speed comparator 5 begins to operate in response to a rise of the FG pulse which is shown in FIG. 2(b). The speed comparator 5 is reset at the timing of the second rise of the FG pulse. By this, a ramp voltage is generated in a cycle twice as long as the period of the FG pulse. Then, as shown in FIG. 2(c), a sample-and-hold pulse for sampling the ramp voltage of FIG. 2(b) is generated at the time of a rise of the FG pulse taking place during the generation of the ramp voltage. As a result, a voltage which is held as shown in FIG. 2(d) is output as the speed error voltage in a cycle two times as long as the period of the FG pulse.

Therefore, if the period of the FG pulse is stable as represented by a period t1, a voltage V of the middle point of the ramp voltage is always sampled and held in response to the sample-and-hold pulse. In that case, the middle point voltage of the speed error voltage is unvarying. If the rotation speed of the motor 2 becomes slower to increase the width and period of the FG pulse, the sampling point of the ramp voltage comes to deviate toward a higher point. Then, the speed error voltage to be held shifts to a higher value, as represented by a period t2. In a case where the rotation speed of the motor 2 becomes faster to decrease the period and width of the FG pulse, the sampling point of the ramp voltage deviates to a lower point. In that instance, the speed error voltage shifts to a lower voltage, as represented by a period t3.

The speed error voltage which includes information on a rotation speed error of the motor 2 thus can be generated from the FG pulse in a cycle which is two times as long as the period of the FG pulse.

Figures 3A, 3B:
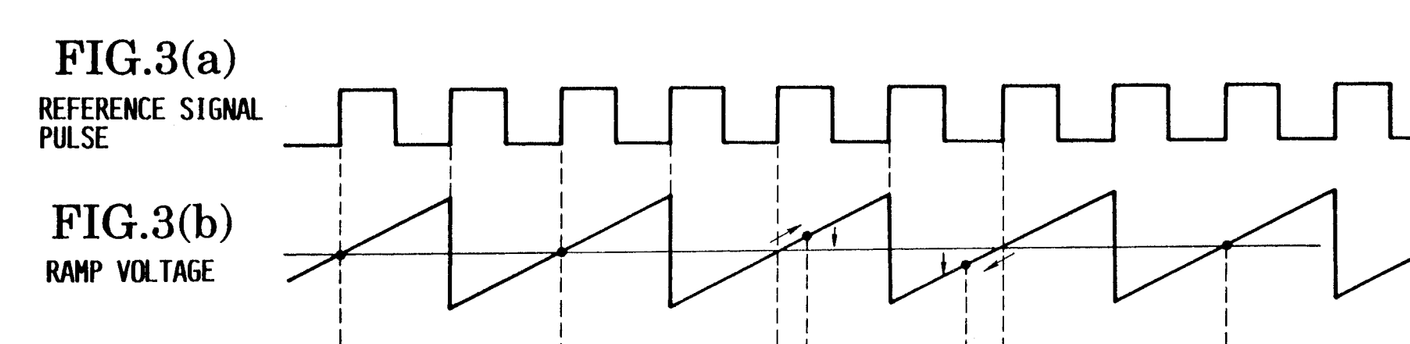
FIGS. 3(a) to 3(d) are timing charts for explaining a phase servo-control operation performed on the basis of a PG pulse signal.
Figures 3C, 3D:
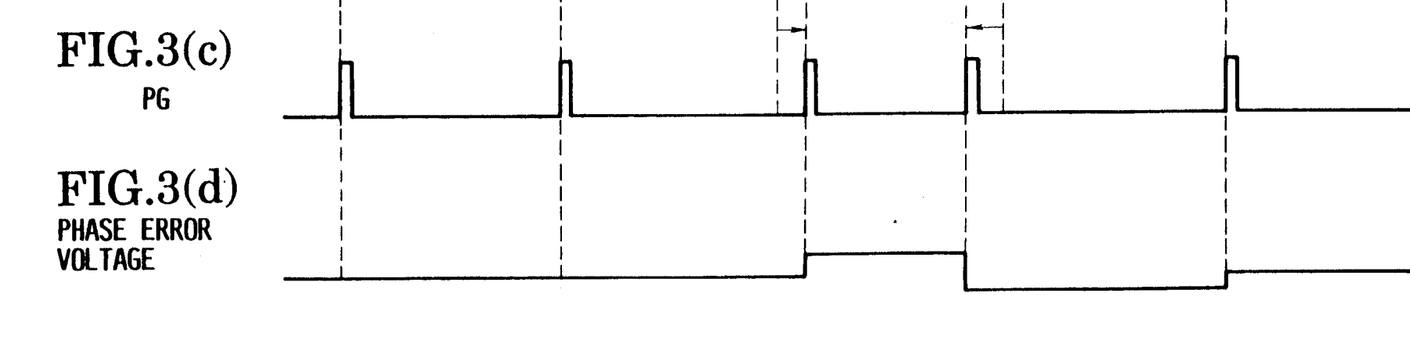

FIGS. 3(a) to 3(d) are timing charts for explaining the operation of the phase comparator 6 which is arranged to generate the phase error voltage by receiving the PG pulse. With a reference pulse signal which is shown in FIG. 3(a) supplied from the signal oscillator 7, the phase comparator 6 begins to operate in response to a rise of the reference pulse, as shown in FIG. 3(b). The phase comparator 6 is reset at the timing of a next rise of the reference pulse. In other words, a ramp voltage is generated in a cycle which is twice as long as the period of the reference pulse. The period of the reference pulse is set at the normal generating interval of the PG pulse which is obtained, in theory, under a phase-locked condition. Every time the PG pulse is received, the phase comparator 6 uses it as a sample-and-hold pulse and samples and holds, as shown in FIG. 3(c), the ramp voltage of FIG. 3(b). Then, as shown in FIG. 3(d), the voltage thus held is output from the phase comparator 6 in a cycle twice as long as the period of the PG pulse.

In a case where the PG pulse is constantly received at a normal timing under a phase-locked condition, therefore, the ramp voltage is sampled always at its middle point. The voltage thus sampled and held remains unvarying. However, if the phase of the PG pulse deviates from the reference pulse, the sampling point of the ramp voltage wave form of FIG. 3(b) changes to cause a change in the held voltage of FIG. 3(d).

The above-stated arrangement enables the phase error voltage which includes information on the rotation speed error of the motor 2 to be obtained from the PG pulse at the period of the PG pulse.

Again referring to FIG. 1, a phase lock detector 9 is arranged to detect from the output of the phase comparator 6 a state of having the PG pulse in phase with the reference pulse of the reference signal oscillator 7 to be locked to that state. Upon detection of the phase-locked state, the phase-lock detector 9 outputs a phase lock detection signal. In other words, the phase lock detector 9 may be composed of a window comparator which is arranged to determine whether the output voltage of the phase comparator 6 is within a given range having its value in the middle of the range when the phase-locked state is obtained.

A mixing circuit 8 is arranged to add together in a given mixing ratio the speed and phase error voltages output from the speed and phase comparators 5 and 6. The mixing circuit 8 is provided with filters of varied kinds such as a low-pass filter, etc. which are arranged to permit setting of the response characteristic, stability, etc. of a feedback loop in conjunction with an amplifier 10. The amplifier 10 is arranged to amplify the speed and phase error signals output from the mixing circuit 8. The amplifier 10 is provided with a filter element which determines the characteristic of the feedback loop in conjunction with the above-stated filters of the mixing circuit 8.

A reproduction amplifier 11 is arranged to amplify up to a given level a signal reproduced by the magnetic head 1 from the magnetic tape T at the time of reproduction. A reproduced signal processing circuit 12 is arranged to demodulate the signal output from the reproduction amplifier 11 and to process the demodulated signal in a given manner into a standard video signal. A sync signal separation circuit 13 is arranged to separate and extract a sync signal from the video signal output from the reproduced signal processing circuit 12. A ½ H killer circuit 14 is arranged to remove from the sync signal a horizontal sync signal in which pulse signals having a period approximately equal to ½ of the horizontal sync signal's period are reduced. The horizontal sync signal H-sync output from the ½ H killer circuit 14 is supplied to an F-V (frequency-to-voltage) conversion circuit 15. The F-V conversion circuit 15 is arranged to F-V convert the horizontal sync signal having passed through the ½ H killer circuit 14 to output an error voltage obtained from the horizontal sync signal included in the reproduced signal. A sample-and-hold circuit 16 is arranged to remove the head switching noise, which occurs when the head confronting the head drum is switched, from the error voltage obtained at the output of the F-V conversion circuit 15.

Figure 4A:
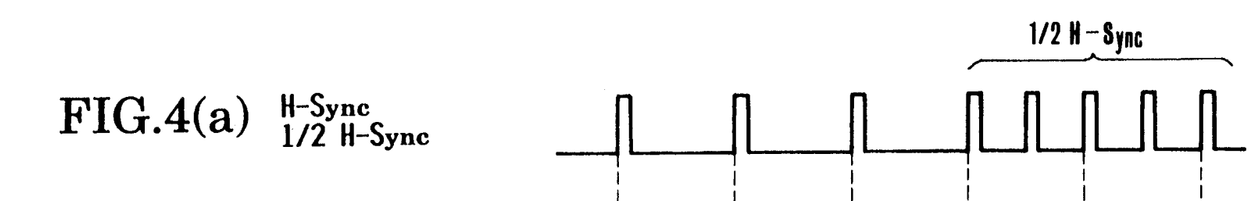
FIGS. 4(a) to 4(c) are timing charts for explaining a means for removing a synchronizing signal of ½ period from a reproduced horizontal synchronizing signal.
Figure 4B:
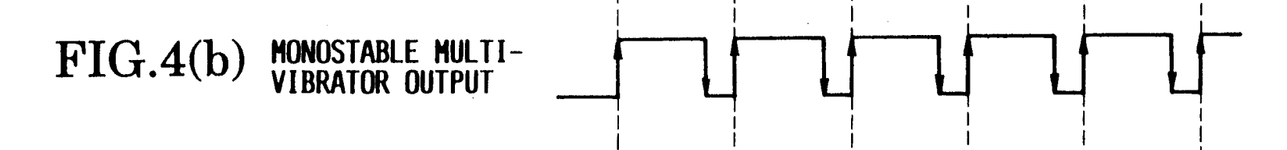
Figure 4C:
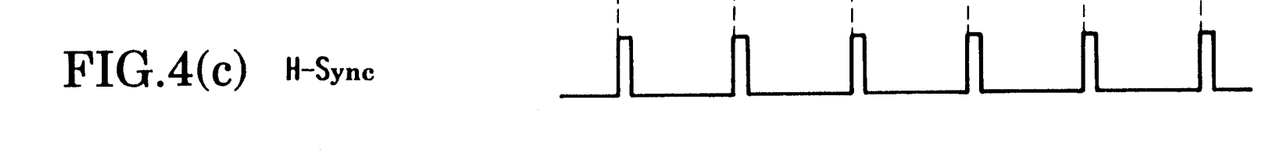

The ½ H killer circuit 14 and the sample-and-hold circuit 16 are provided for the following reason: In the TV system which performs interlace scanning, an equalizing pulse and a serrated pulse are formed before and after the vertical sync signal and during its vertical blanking period for the purpose of ensuring that the interlace scanning between fields is accomplished in a synchronized state. As a result, there is a part where the period of the horizontal sync signal becomes ½ thereof. If the ½ horizontal sync signal is allowed to be supplied as it is to the F-V conversion circuit 15 (which operates in the same manner as in the case of the F-V conversion of the FG pulse described in the foregoing with reference to FIGS. 2(a) to 2(d)), the error voltage would be output by mistake as this part might be mistaken for disordered synchronization. To solve this problem, the ½ H killer circuit 14 is arranged to prevent the ½ horizontal sync signal from being supplied to the F-V conversion circuit 15. The ½ H killer circuit 14 operates as follows:

FIGS. 4(a) to 4(c) are timing charts for explaining the operation of the ½ H killer circuit 14. The horizontal sync signal which is shown in FIG. 4(a) is supplied to the circuit 14. Then, in synchronism with the rise of the horizontal sync signal, a monostable multivibrator which is not shown generates a pulse of a width which is more than ½ of the horizontal sync period and less than the horizontal sync period, as shown in FIG. 4(b). In synchronism with the rise of the pulse of FIG. 4(b), a pulse is generated as shown in FIG. 4(c) and is output as the horizontal sync signal. The ½ horizontal sync signal is thus removed and, in place of it, only the horizontal sync signal of 1H (one horizontal sync period) is output.

Next, the description of the sample-and-hold circuit 16 is as follows: In the video tape recorder of the helical scanning type as in the case of this embodiment, recording or reproduction is performed by obliquely tracing a tape for each field alternately with magnetic heads which are allocated on the outer circumference of the rotary head drum and spaced, for example, at an angle of 180 degrees. Therefore, a head switching noise inevitably occurs during the vertical blanking period. As a result, the error voltage output from the F-V conversion circuit 15 includes incorrect error information due to this head switching noise and an unstable signal state obtained before and after the noise. The sample-and-hold circuit 16 is arranged to remove this incorrect information of the head switching noise part and to make interpolation with an error voltage which is obtained immediately before the head switching action and held there.

Figure 5A:
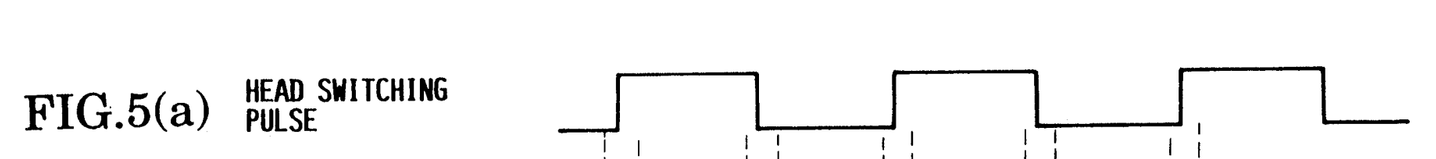
FIGS. 5(a) to 5(d) are timing charts for explaining a means for removing a head switching noise from information on speed servo-control performed on the basis of a reproduced horizontal synchronizing (hereinafter referred to as sync for short) signal.

FIGS. 5(a) to 5(d) are timing charts for explaining the operation of the sample-and-hold circuit 16. FIG. 5(a) shows a head switching pulse. In this case, the magnetic head 1 consists of a head CH1 for a first channel and another head CH2 for a second channel. The use of heads is switched from one head over to the other for every field.

Figures 5B, 5C:
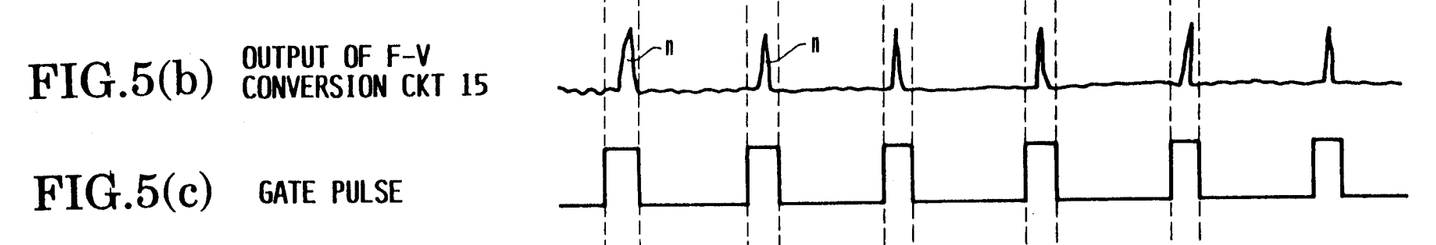

FIG. 5(b) shows the output wave form of the F-V conversion circuit 15. As shown, a switching noise "n" is produced at the time of head switching.

Figure 5D:
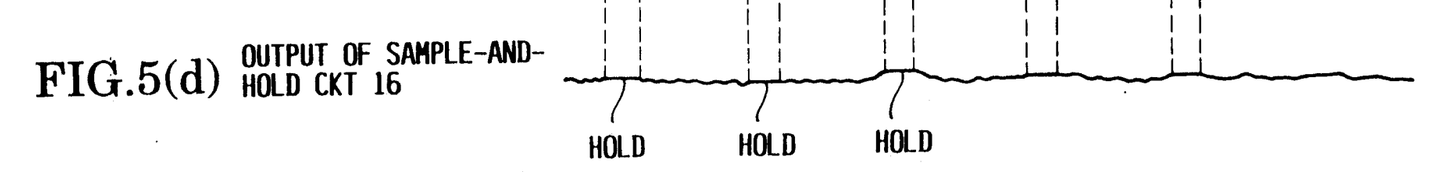

The sample-and-hold circuit 16 is arranged to be opened and closed by a gate pulse which is shown in FIG. 5(c) and which is generated during a period before and after the head switching action on the basis of, for example, the reference signal of the reference signal oscillator 7. A signal part having the switching noise "n" and the unstable signal parts before and after the noise are removed by this arrangement. In addition to that, the sample-and-hold circuit 16 holds a signal level obtained immediately before the generation of the gate pulse and outputs a signal wave form, as shown in FIG. 5(d).

The unnecessary error voltage part resulting from the head switching noise is thus removed during predetermined periods before and after the noise.

Referring again to FIG. 1, an amplifier 17 is arranged to amplify the signal output from the sample-and-hold circuit 16 and is provided with a filter element for determining the stabilizing condition and the responsivity of an error detection feedback loop operating on the basis of the horizontal sync signal. A mixing circuit 18 is arranged to mix, according to an instruction from a system control circuit 21, the error voltage output from the amplifier 17 and another error voltage obtained through an error correction feedback loop from the FG and PG pulses output from the amplifier 10 mentioned in the foregoing. The gain, the system stabilizing condition, the response characteristic, etc., are made variable by combining the outputs of the above-stated two feedback servo-control systems. Therefore, the mixing circuit 18 is provided with means for varying the characteristics of the gain and the filter element, etc. for setting them at their optimum states. Another amplifier 19 is arranged to amplify a voltage output from the mixing circuit 18 and obtained by adding up the error voltages obtained on the basis of the FG and PG pulses and the reproduced horizontal sync signal. The amplifier 19 is provided with gain and characteristic varying means for optimizing, in conjunction with the mixing circuit 18, the signal level which varies accordingly as the feedback loop based on the horizontal sync signal is added or separated; the stabilizing condition; and the response characteristic. More specifically, the use of filters is changed from one over to another to this purpose.

A motor driving circuit 20 is arranged to control the rotation of the head drum rotating motor 2 on the basis of the error voltage output from the amplifier 19 in such a way as to make the voltage output from the amplifier 19 constant by lessening the degree of error indicated by the error voltage.

The system control circuit 21 is provided for controlling the whole system. The system control circuit 21 is arranged to select one of two control modes according to the output of the phase lock detector 9. In one mode, the error correction feedback loop based on the FG and PG pulses is solely used for control. In the other mode, the error correction feedback loop based on the horizontal sync signal is added to the control which is based on the FG and PG pulses. Further, the system control circuit 21 is capable of optimizing the variable stabilizing conditions and the response characteristic of the whole system by adding the error correction feedback loop which is based on the horizontal sync signal. For this purpose, the system control circuit 21 is arranged to switch the use of filter and gain setting circuits, etc. which are provided within the mixing circuit 18 for setting its response characteristic, its stabilizing conditions and the ratio in which the error voltages of the feedback loops are to be mixed.

Further, the system control circuit 21 also controls the amplifier 19 to switch from one over to another the gains and filters of the amplifiers 19 according to the signal level and the characteristic of the system including that of the mixing circuit 18 which change when the mode of using only the servo-control system based on the FG and PG pulses is changed over to the mode of adding thereto another servo-control system based on the horizontal sync signal and vice versa.

Further, the system control circuit 21 controls the sample-and-hold circuit 16 in such a way as to control the generation timing of the gate pulse to be used for removal of the head switching noise. In addition to this, the operation of the motor driving circuit 20 is also controlled according to the operating mode selected.

The rotation control device which is arranged according to the invention described above operates in the following manner: The magnetic tape T is loaded on the rotary head drum by known means which is not shown. When the reproducing mode is obtained, the system control circuit 21 first supplies a motor-ON signal to the motor driving circuit 20. The motor 2 is started.

When the motor 2 begins to rotate, the FG pulse generator 3 and the PG pulse generator 4 respectively output the speed detecting FG pulse and the phase detecting PG pulse. These FG and PG pulse signals are supplied to the speed comparator 5 and the phase comparator 6, respectively. The speed comparator 5 and the phase comparator 6 respectively operate in the manner as described in the foregoing with reference to FIGS. 2(a) to 2(d) and 3(a) to 3(d), so that the speed error voltage and the phase error voltage are output.

In this initial stage, the system control circuit 21 cuts off the servo-control system which is based on the horizontal sync signal and does not allow the mixing circuit 18 to mix that servo-control system with the other servo-control system which is based on the FG and PG pulses, until the rotation of the rotary head drum becomes sufficiently stable and there obtains a phase-locked state, i.e., until the phase lock detection signal is output from the phase lock detector 9. Therefore, in this stage, until a phase-locked state is obtained, the rotation of the drum rotating motor is controlled solely by the servo-control system which is based on the FG and PG pulses. In this instance, the stabilizing conditions, responsivity, gains, etc., of the mixing circuit 18 and the amplifier 19 are switched and adjusted to optimize them solely by the feedback loop of the servo-control system which is based on the FG and PG pulses.

When the rotation of the drum rotating motor comes to be phase-locked, the phase lock detector 9 supplies the system control circuit 21 with the phase lock detection signal. Then, a reproduced video signal which has been reproduced from the magnetic tape T by the magnetic head 1 and processed by the reproduced signal processing circuit 12 becomes stably restorable to its original state. This is detected by the system control circuit 21. The system control circuit 21 then controls the mixing circuit 18 and causes the output of the servo-control system which is based on the reproduced horizontal sync signal, i.e., the voltage output from the amplifier 17, to be added to that of the other servo-control system which is based on the FG and PG pulses, i.e., the voltage output from the amplifier 10. As a result, the rotation of the drum rotating motor 2 comes to be controlled by the horizontal sync signal (H-sync) reproduced from the magnetic tape T as well as by the speed (FG) and the phase (PG).

In that instance, following the change in the controlling state of the servo-control system, the stabilizing condition, the responsivity, the frequency characteristic of the system and, in addition to them, the signal mixing ratio, the signal level, etc. of each servo-control system come to change. Therefore, in accordance with the instruction of the system control circuit 21, the filters and gains are switched and adjusted within the mixing circuit 18 and the amplifier 19. The control operation is thus performed to optimize the characteristics of the servo-control systems.

From the horizontal sync signal extracted from the reproduced video signal output from the reproduced signal processing circuit 12, the ½ H killer circuit 14 removes the ½ horizontal sync signal obtained before and after the vertical sync signal in the manner as mentioned in the foregoing. The output of the circuit 14 is converted into the error voltage by the F-V conversion circuit 15. The adverse effect of the head switching noise is removed by the sample-and-hold circuit 16. The error voltage is then output from the amplifier 17. Therefore, the speed error voltage thus can be obtained solely on the basis of a normal horizontal sync signal.

Since the servo-control is applied by using the horizontal sync signal included in the reproduced video signal in the above-stated manner, the speed of the head relative to the tape can be very accurately controlled to be constant relative to the period of the horizontal sync signal included in the reproduced video signal. Therefore, the reproduced video signal can be obtained without any time base variations. This enables the rotation control device to make reliable compensation to uniformalize the period of the horizontal sync signal, so that jitters can be reduced to a great degree even in the case of a reproduced signal having jitters which result from elongation or the like of the magnetic tape or the vibrations, etc., of the tape transport mechanism and hardly detectable by the method of using only the FG and PG pulses.

In other words, even in cases where signals are recorded on the magnetic tape under a condition of having a great amount of jitters, such signals can be reproduced with the jitters removed as the speed of the magnetic head relative to the sync signals recorded on the magnetic tape can be kept unvarying during a reproducing operation.

The rotation control device arranged according to the invention as mentioned in the foregoing controls the rotation of a rotary body not only on the basis of the speed and phase of the rotary body driving motor but also on the basis of the sync signal recorded on the recording medium after a phase-locked state is obtained. The conventional device which uses only the information on the position of the rotary head drum has been incapable of removing time base fluctuations in reproducing signals in cases where the signals are recorded on the recording medium in a state of having jitters, where the recording medium has been deformed by elongation or the like or where vibrations or the like occur in the tape transport system. Whereas, the embodiment of this invention described is capable of reproducing signals with no time base fluctuations to give adequately reproduced picture planes which are free from any lateral sway, etc.

While the rotation control device o the invention is applied to the helical scanning type video tape recorder in the case of the embodiment described, the invention is not limited to this. The invention is applicable to a wide range of apparatuses including, for example, an apparatus of the kind using a disc-shaped recording medium so long as a sync signal or the like is included in the signals to be reproduced from the recording medium.

What is claimed is:

1. A rotation control device comprising:
   a) a rotary body for moving a recording medium and a head means relative to each other;
   b) speed control means for detecting a speed deviation of said rotary body and for controlling a rotation speed of said rotary body according to the speed deviation detected;
   c) phase control means for detecting a rotation phase deviation of said rotary body and for controlling a rotation phase of said rotary body according to the rotation phase deviation detected;
   d) gate means for extracting a synchronizing signal in the video signal reproduced from the recording medium by said head means; and
   e) synchronizing control means for synchronizing, when detecting that the rotation phase of said rotary body has been locked, said rotary body with the synchronizing signal extracted by said gate means.

2. A device according to claim 1, wherein said recording medium is a magnetic tape, and wherein said rotary body is provided with recording or reproducing head means arranged on a periphery of said rotary body for performing a recording or reproducing operation by obliquely tracing said magnetic tape.

3. A device according to claim 1, wherein said speed control means controls the rotation speed of said rotary body to be kept at a predetermined value on the basis of an FG pulse generated according to the rotation speed thereof.

4. A device according to claim 3, wherein said phase control means controls the rotation phase of said rotary body on the basis of a result of a phase comparison made between a reference signal and a PG pulse generated according to the rotation phase of said rotary body.

5. A device according to claim 4, further comprising driving means for controlling the rotation speed of said rotary body on the basis of a signal obtained by mixing a speed error signal and a phase error signal respectively output from said speed control means and said phase control means.

6. A device according to claim 1 or 5, wherein said synchronizing control means is arranged to synchronize the rotation speed of said rotary body with a synchronizing signal included in the signal reproduced from said recording medium by said head means.

7. A device according to claim 6, wherein said synchronizing signal is a horizontal synchronizing signal.

8. A device according to claim 7, wherein said synchronizing control means includes an F-V conversion circuit for frequency-to-voltage converting the horizontal synchronizing signal included in the reproduced signal and a gate circuit for removing a switching noise caused by a switching action performed on said head means.

9. A device according to claim 8, wherein said synchronizing control means is arranged to control the rotation speed of said rotary body by adding a speed error voltage obtained on the basis of the horizontal synchronizing signal output from said gate circuit to outputs of said speed control means and said phase control means.

10. A device according to claim 9, wherein said synchronizing control means further includes a pulse removing circuit for removing an equalizing pulse and a serrated pulse located in the neighborhood of a vertical synchronizing signal included int he reproduced signal.

11. A rotation control device comprising:
   a) a rotary body for moving a recording medium and a head means relatively to each other;
   b) rotation control means for controlling said rotary body to rotate at a predetermined speed and a predetermined phase; and
   c) supply means for supplying, when detecting that a rotation of said rotary body has been locked to said predetermined phase, to said rotation control means a rotation error signal indicative of a rotation error of said rotary body relative to a control signal recording on said recording medium, wherein said control signal is a pulse signal portion having a predetermined period which has been extracted from the recording signal recorded on said recording medium and from which a switching noise has been eliminated.

12. A device according to claim 11, wherein said recording medium is a magnetic tape, and wherein said rotary body is provided with recording or reproducing head means arranged on a periphery of said rotary body for performing a recording or reproducing operation by obliquely tracing said magnetic tape.

13. A device according to claim 11, wherein said rotation control means includes FG pulse generating means for generating a number of pulses proportional to a rotational frequency of said rotary body and PG pulse generating means for generating a PG pulse signal corresponding to a rotation phase of said rotary body, said rotary body being arranged to be caused to rotate at the predetermined speed and at the predetermined phase according to outputs of said FG and PG pulse generating means.

14. A device according to claim 13, wherein said control signal is a horizontal synchronizing signal included in a signal reproduced from said recording medium by said head means.

15. A device according to claim 14, wherein said supply means is arranged to detect a variation of said horizontal synchronizing signal and to supply said control signal to said rotation control means to cause a rotation state of said rotary body to follow said variation detected.

16. A device according to claim 15, wherein said supply means includes an F-V conversion circuit for frequency-to-voltage converting the horizontal synchronizing signal included in the reproduced signal and a gate circuit for removing switching noise caused by a switching action performed on said head means.

17. A device according to claim 16, wherein said supply means is arranged to control the rotation speed of said rotary body by adding a speed error voltage obtained on the basis of the horizontal synchronizing signal output from said gate circuit to outputs of said speed control means and said phase control means.

18. A device according to claim 17, wherein said supply means includes a pulse removing circuit for removing an equalizing pulse and a serrated pulse located in the neighborhood of a vertical synchronizing signal included in the reproduced signal.

19. A video tape recorder comprising:
   a) a rotary head drum provided with a head for recording or reproduction and arranged to be rotated relative to a tape-shaped recording medium which is transported at a predetermined speed when performing recording or reproduction;
   b) speed control means for controlling said rotary head drum to rotate at a constant speed on the basis of an FG pulse generated according to a rotation speed of said rotary head drum;
   c) phase control means for controlling said rotary head drum to rotate at a constant phase on the basis of a PG pulse generated according to a rotation phase of said rotary head drum;
   d) phase lock detecting means for detecting that a rotation of said rotary head drum has been locked by said phase control means; and
   e) synchronizing control means for generating a control signal according to a variation of a synchronizing signal included in a signal reproduced by said head and for controlling the rotation speed of said rotary head drum according to said control signal in response to an output of said phase lock detecting means, wherein said control signal is a pulse signal portion having a predetermined period which has been extracted from the record signal recorded on said recording medium and from which a switching noise has been eliminated.

20. A video tape recorder according to claim 19, wherein said control signal is a horizontal synchronizing signal, and wherein said synchronizing control means causes the rotation speed of said rotary head drum to follow a variation of said horizontal synchronizing signal.

21. A video tape recorder according to claim 20, wherein said synchronizing control means includes an F-V conversion circuit for frequency-to-voltage converting the horizontal synchronizing signal included in the reproduced signal and a gate circuit for removing a switching noise caused by a switching action performed on said head means.

22. A video tape recorder according to claim 21, wherein said synchronizing control means is arranged to control the rotation speed of said rotary head drum by adding a speed error voltage obtained on the basis of the horizontal synchronizing signal output from said gate circuit to outputs of said speed control means and said phase control means.

23. A video tape recorder according to claim 22, wherein said synchronizing control means further includes a pulse removing circuit for removing an equalizing pulse and a serrated pulse located in the neighborhood of a vertical synchronizing signal included in the reproduced signal.

* * * * *